United States Patent
Vergara

[19]

[11] Patent Number: 5,899,477
[45] Date of Patent: May 4, 1999

[54] HUMAN DRIVE SYSTEM USING SYNCHRONIZED INDEPENDENT PEDALS WITH SINUSOIDAL TYPE VARIABLE EFFICIENCY

[75] Inventor: Pablo Carrasco Vergara, Malaga, Spain

[73] Assignee: Rotor Componentes Tecnologicos S.L., Madrid, Spain

[21] Appl. No.: 08/680,672

[22] Filed: Jul. 16, 1996

[30]  Foreign Application Priority Data

Jul. 17, 1995 [ES] Spain ..................................... 9501429
Jul. 15, 1996 [ES] Spain ..................................... 9601579

[51] Int. Cl.$^6$ ..................................................... B62M 1/02
[52] U.S. Cl. ........................ 280/261; 74/594.2; 280/260; 474/141
[58] Field of Search .................................. 280/259, 260, 280/261, 262; 474/141; 74/594.1, 594.2, 594.3

[56]  References Cited

U.S. PATENT DOCUMENTS

| | | | |
|---|---|---|---|
| 528,145 | 10/1894 | Carr . | |
| 591,488 | 10/1897 | McMullin . | |
| 1,217,691 | 2/1917 | Bonvicn | 280/261 |
| 3,259,398 | 7/1966 | Hattan | 280/261 |
| 4,159,652 | 7/1979 | Trammell | 280/259 |
| 4,193,324 | 3/1980 | Marc | 280/260 |
| 4,398,740 | 8/1983 | Clem | 280/261 |
| 4,816,009 | 3/1989 | Philipp | 280/236 |
| 4,865,577 | 9/1989 | Freudenstein | 280/259 |
| 5,261,294 | 11/1993 | Ticer et al. | 280/260 |

FOREIGN PATENT DOCUMENTS

| | | | |
|---|---|---|---|
| 379527 | 3/1940 | Italy | 280/259 |
| 9402381 | 11/1994 | Spain . | |

*Primary Examiner*—Anne Marie Boehler
*Attorney, Agent, or Firm*—Ladas & Parry

[57] ABSTRACT

A drive mechanism applicable to bicycles for increasing the efficiency of pedaling action via independent pedals with a sinusoidally varying transmission ratio. The drive mechanism achieves increased efficiency by making the pedals independently synchronized with a varying transmission ratio so that the coincidence of both legs in dead centers is avoided when one pedal is in an upper and the other pedal is in a lower position, making the pedal which is going up move more rapidly than the pedal going down. This kinematic is achieved in two possible embodiments: in the first embodiment, two pairs of elliptic gears are used to synchronize the independent pedals, and two eccentric chain wheels, integral with respective pedal rods, are used to transmit power through two parallel corresponding chains towards the rear wheel, while in the second embodiment, the elliptic gears synchronize the kinematics and transmit power from the left pedal rod towards the right pedal rod, integral with the eccentric chain wheel, and from there towards the rear wheel by the corresponding chain.

5 Claims, 8 Drawing Sheets

HUMAN DRIVE SYSTEM USING SYNCHRONIZED INDEPENDENT PEDALS WITH SINUSOIDAL TYPE VARIABLE EFFICIENCY

The invention relates to improvements in a human drive system using synchronized independent pedals with sinusoidally varying transmission ratio, the system being essentially applicable to bicycles in order to achieve a better distribution of the power delivered by the cyclist's legs.

In Spanish invention patent P9402381, by the same applicant, a human drive system using synchronized independent pedals with sinusoidally varying transmission ratio is described, based on which the performance provided by pedalling on bicycles may be increased through a better distribution of the power delivered by the legs, making the pedals independent so that each pedal drives its own axle, producing a kinematic effect and thereby avoiding the coincidence of both legs in dead centers (namely when one of the pedals is in the upper and the other in the lower position) by causing the pedal going up to move faster than the one going down, all of which involves an increase in average power for the same degree of effort, thereby improving the quality of the effort delivered.

In order to achieve these performances, the independent pedal drive system corresponding to said invention patent is based on eliminating the 180° offsetting link between the pedals in order to vary the leg's kinematics so that each leg slowly covers the first quadrant, gradually increasing in speed up to the third quadrant and minimizing the time spent in passing through the latter. Thus, when the right pedal is leaving a "good" zone (where most of the work is performed), the left pedal advances to avoid both legs from coinciding dead centers (one up and the other down) midway between quadrants 2 and 4. The resulting effect is that one leg cooperates with the other leg at a point where the latter starts to lose efficiency in the effort being provided.

Thus, for a constant chain speed, the rotation speed of the pedal is required to vary in time according to a sinusoidal type function (of a period equal to the cycle) as a direct result of the mechanism being used. The achieved resulting effects is that the power curve per leg in the time frame of one cycle is "stretched" for the efficient area in order to cover a more extensive area. In this manner, in the curve display for both legs, the curves cross in points of a larger ordinate so that the minimum power is increased to achieve a more even full power and effort in each cycle, thus providing a considerably increased mean power.

Thus, this invention patent describes two geometric possibilities of obtaining a mechanism providing the desired kinematics, as previously described. One possibility is based on an independent drive for each pedal involving two chains and eccentric chain wheels whereby each pedal rod is integral to its own axle, both rotating freely in relation to the axle onto which they are mounted. The chain wheels comprise a circular ring gear attached to the pedal rod by means of an eccentric "star", the eccentricity-determining parameter being designated by $\delta$ (chain wheel off-centering/original radius of the ring gear). Each chain wheel moves its individual chain (one on each side of the bicycle) which transmits power to the rear bicycle wheel through a sprocket wheel provided for each chain. A tension pulley must be fitted on each chain.

The second geometric possibility of obtaining the mechanism is based on an independent elliptic drive for each pedal through a single circular chain wheel. In this case, the purpose is to transmit through elliptic gears all the power to the chain wheel, which coordinates the pedal kinematics; the mechanism therefore comprises two axles in this case, on one of which are mounted the pedal rods and corresponding ellipses, so that the angle formed by the pedal rod and the larger radius of the ellipse must in each situation be such that when drive is generated at that point the pedal is located approximately 90° from the upper dead center (maximum torque point).

Both ellipses are mounted on the same side, one being integral to the axle and the other having its pedal rod mounted to rotate freely in regard to said axle, the axle passing through one of the ellipse's centers. Two additional ellipses are mounted on a second axle, engaging the former ellipses so that the force received by said second ellipses is transmitted to the axle and from said axle, through a gear drive, to the corresponding chain wheel mounted freely on the first axle, proceeding from said chain wheel on to the standard drive chain.

The first improvement to this said application is that the independent pedals drive comprises two chains and two eccentric chain wheels synchronized through elliptic gears.

More specifically, the mechanism according to a first improvement of the invention is characteristic in that each pedal rod is integral to its own chain wheel, each pedal rod-chain wheel assembly being independent from the other. The chain wheels are (standard) circular ring gears attached to the pedal rod through an eccentric star (or spider); the $\delta$-designated parameter (chain wheel off-centering/original radius of the ring gear) establishes the eccentricity. Thus, each chain wheel drives its own chain to transmit power to the bicycle wheel through corresponding sprocket wheels. A tension pulley ("shift") is necessary for each chain. The angle formed by the pedal rod and the larger radius of the chain wheel must be such that when the chain wheel acts on the chain the pedal is positioned approximately 90° from the upper dead center (maximum torque point).

To achieve this full synchronization, two elliptic gear pairs are coupled to a secondary axle, the rotation of which determines the offsetting between both pedals.

The difference with the first mechanism described in the above mentioned patent P9402381 is that a device is incorporated to provide full synchronization to the pedalling; the difference in respect to the second mechanism in the patent lies in that power output from the pedal rods goes directly to the bicycle wheel through the chains, without the need to travel twice (both ways) through a gear drive (thus avoiding subsequent losses). In this manner, the gears in this mechanism are required solely to synchronize the pedalling action.

In order to satisfactorily achieve this purpose, i.e. that the main power does not pass through the gears, "freewheel" sprocket wheels must be used for each pedal so that no linkage exists between them other than the one imposed by the bicycle wheel. Furthermore, $\delta > 2*\epsilon$ is necessary; e.g., for ellipses taken from $\epsilon = 0.125$, the value of $\delta$ selected could be 0.26 (>0.25).

This mechanism allows for the use of gear shifts in the sprocket wheels involving two parallel standard gear shifts (causing no synchronization problems, which would be avoided by the fact that freewheel sprocket wheels are being used, the only effect being in a delayed power transmission from the affected pedal at that very moment, as it conveys power through the gears) or some other gear shift already marketed which maintains a fixed offsetting between the chains (gear shift integrated in the bushing). Given its characteristics, the mechanism's main use applies to track racing and other speed competitions (against the clock) normally involving a tight efficiency margin.

A second improvement applies to the above mentioned mechanism one of the two chains comprising part of the mechanism, is removed together with its corresponding chain wheel, sprocket wheel and gear shift or tension pulley, thus permitting the installation of two pairs of gears on that side of the frame, specifically on the side from which said components were removed. In this manner, greater configuration similarity is achieved in conventional bicycles, in addition to having sufficient space available on the other side of the frame for installing several chain wheels for gear shifting, as in the case of conventional bicycles.

Through this solution, in which $\delta$ (chain wheel off-centering/original radius of the ring gear) is equal to double the value of $\epsilon$ ($\epsilon$ being the eccentricity of the gears), drive from one of the pedal rods is conveyed directly by chains, while the opposite pedal rod is affected by drive through gears, specifically through the two pairs of mounted gears, one of them mounted on one of the axles and the other mounted on the other axle in the frame, one of these axles corresponding to the active pedal axle itself.

The gears are advantageously elliptic, so that both non-integral assemblies corresponding to the pedal rods rotate independently around one same axle, specifically the one considered to be the active pedal or main axle. The gears in each pair are in each case centered on one of the centers in respect to the corresponding axle.

The four elliptic gears in question have equal eccentricity and size, and they can be circular and off-centered, if necessary.

A third improvement, also claimed in this application, is that the circular eccentric chain wheel is replaced by a non-circular eccentric chain wheel (ovoid) having geometric characteristics which derive in optimized power output. Furthermore, it is possible to incorporate two non-circular chain wheels with these characteristics directly onto the mechanism referred to as the first improvement to replace the eccentric circular chain wheels and thus improve synchronization.

The shape of the non-circular eccentric chain wheel corresponding to this second improvement is the result of applying the envelope of the straight lines which at all times is adopted by the drive chain going from the sprocket wheel to the chain wheel whenever the latter's transmission ratio variation is sinusoidal in time for a constant bicycle speed.

Said shape is dependent on: the chain wheel perimeter (or its number of teeth); the eccentricity $\epsilon$ of the elliptic gears used; the distance between the active pedal axle to the rear bushing; and the size of the sprocket wheel used. However, this latter parameter has a much lesser influence, the design of each chain wheel allowing for a mean value to be chosen between the various sprocket wheels associated to said chain wheel. Thus, the shape of the chain wheel depends on the size of the chain wheel, i.e. N (namely the number of teeth or simply the perimeter of the chain wheel), on the gear eccentricity $\epsilon$ and on the distance D from the active pedal axle to the sprocket wheel chain exit point (mean value). This is the point from where the straight lines are taken which generate the above mentioned envelope which shapes the chain wheel.

The advantages deriving from the second improvement may be summed-up as follows:

The bicycle incorporating the mechanism based on said first improvement is more compact and lightweight and less complex, the number of parts and components being reduced, and is consequently less expensive to manufacture. Furthermore, since it has fewer movable parts, undesirable and unnecessary friction is prevented.

The bicycle is more similar to conventional bicycles.

The mechanism is simpler, in view that in addition to eliminating a chain wheel, a chain, some sprocket wheels and a gear shift, a special bushing incorporating sprocket wheels on both sides is replaced by a standard bushing.

It allows for the installation of gear pairs on the same side of the bicycle frame, thus providing greater space for the gear shift, and further allowing for chain wheel shifts in addition to the sprocket wheel shifts.

Concerning the advantages deriving from the third improvement, the following may be mentioned:

Power output is optimized and greater pedalling comfort is provided.

In the event that off-center ovoid chain wheels are used for mechanisms requiring two chains, synchronization between the elliptic gear system (defining the angles between the pedals) and the positions of each pedal imposed by the geometry of its respective chain plate during the cycle is optimized, the angle positions imposed by both systems coinciding and resulting in improved synchronization of the chain, sprocket wheel and chain wheel system, thereby unloading the gear assembly of part of this responsibility and removing the need to provide the gear synchronization mechanism with extreme precision requirements.

In order to complement the subsequent description, a set of drawings is attached which may help to more readily understand the characteristics of the mechanisms performed according to the improvements, the figures in said drawings displaying the following:

Figure 1:
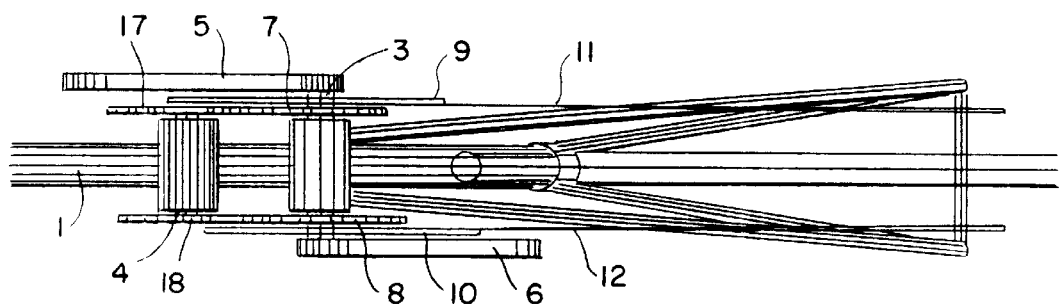
FIG. 1 shows a schematic view or lower plan of the mechanism according to the first improvement of the invention.
Figure 2:
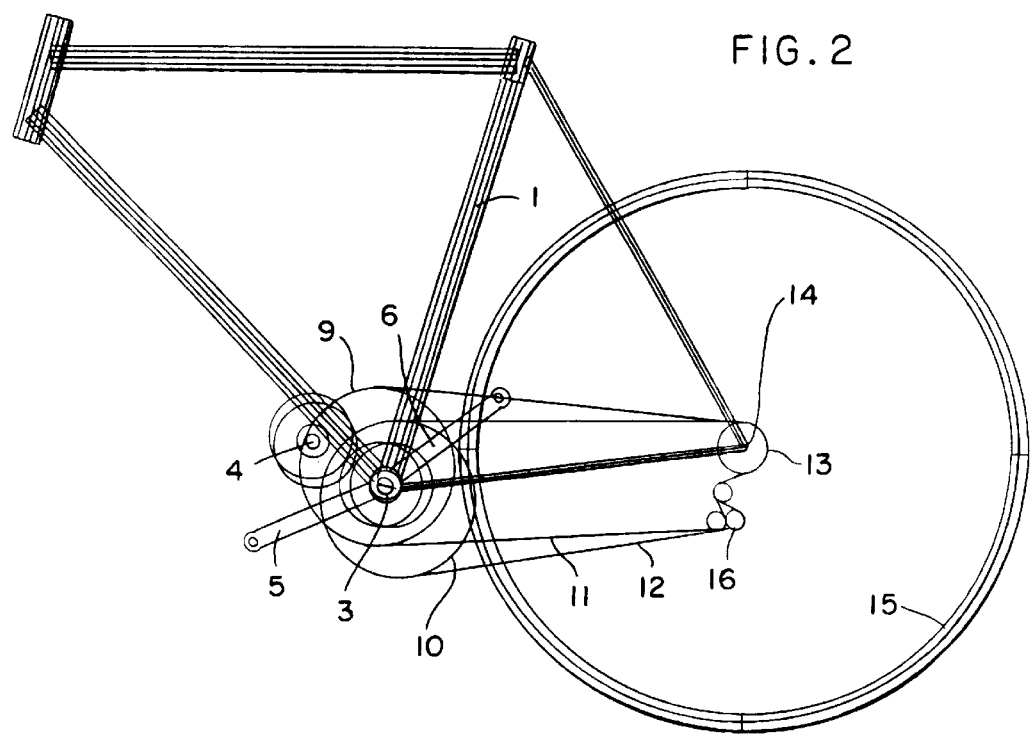
FIG. 2 shows another schematic view, in this case a side elevation, of the same mechanism applied to a bicycle frame or structure.
Figure 3:
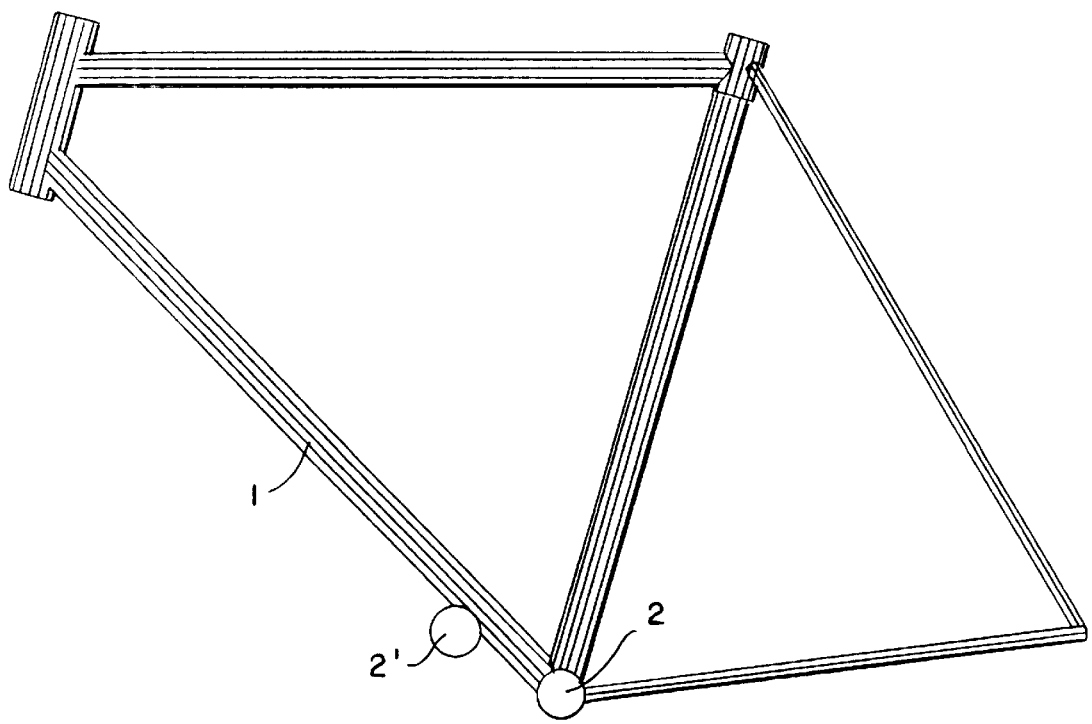
FIG. 3 shows a schematic side view of a bicycle frame having the two axles required for assembling the mechanism displayed in the previous figures.

As can be appreciated in FIGS. 1 to 3, the independent drive pedal mechanism using two chains and two eccentric chain wheels synchronized by elliptic gears according to the first improvement of the invention comprises a chassis or frame (1) providing two housings (2) and (2'), as shown in FIG. 3, for respective axles (3) and (4), in a manner that in the first of these are mounted pedal rods (5) and (6), ellipses (7) and (8), comprising respective gears, and chain wheels (9) and (10), which are eccentric and engage parallel chains (11) and (12) through which rotation movement is transmitted to sprocket wheels (13) installed one on each side of axle (14) on the bicycles's rear wheel (15).

According to the figures, pedal rod (5), ellipse (7), chain wheel (9) and chain (11) correspond to the right side, while pedal rod (6), ellipse (8), chain wheel (10), chain (12) and sprocket wheel (13) correspond to the left side, with the tension pulley or gear shift (16) being shown on this left side.

Axle (3) allows for free rotation of at least one of the previous pedal rod-chain wheel-ellipse assemblies.

On axle (4) are mounted ellipses (17) and (18) which respectively engage ellipses (7) and (8).

The mechanism—namely the parts or components comprised therein—in addition to its assembly and functional association being thus described, the following comments apply:

The gears may be quasi-elliptical (e.g. eccentrically circular, in view that small eccentricities are involved) and having the necessary play, provided they continue to comply with the function of transmitting power "ellipse-to-ellipse" (this requires a high tooth modulus allowing for engagement despite the fact that the tangential condition may be lost). Likewise, the distance between axles may be slightly greater than the ideal distance (the axle being larger than the ellipse) provided the length thus generated remains within the tolerances for the selected modulus.

In view that the mechanism incorporates a second axle (secondary axle 4) the sole modification applicable to the standard frame is the installation of housing (2') for said axle, as shown in FIG. 3; this second axle (4) may be positioned at any other point in respect to the frame (1), provided the distance between axles (3) and (4) is the desired distance.

Furthermore, the possibility may be considered of protecting the gear assembly by means of a fairing (e.g. a plastic "housing") applicable to both bicycles.

Finally, it should be mentioned that the figures used are example displays of the manner in which the mechanism may be assembled, and that any change is perfectly feasible provided the power transmissions described are maintained (e.g. placing the gears on one side of the frame or the other, or even within the frame, in case a double active pedal axle frame or a hull structure is utilized).

Figure 4:
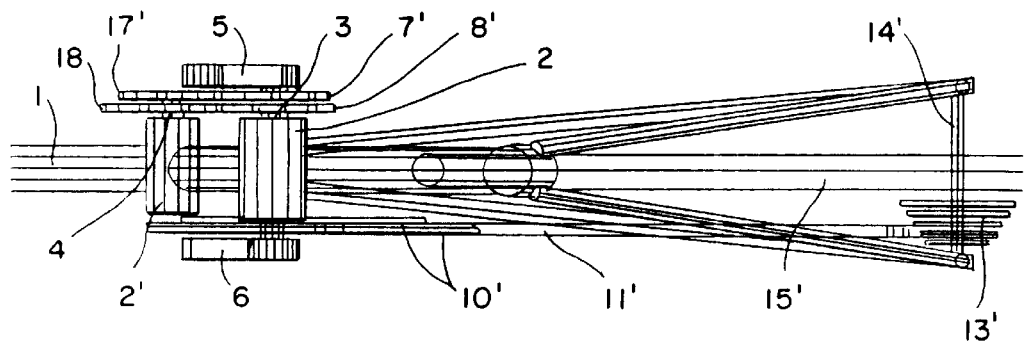
FIG. 4 shows a schematic view or lower plan of the mechanism incorporating the first and second improvements of the invention.
Figure 5:
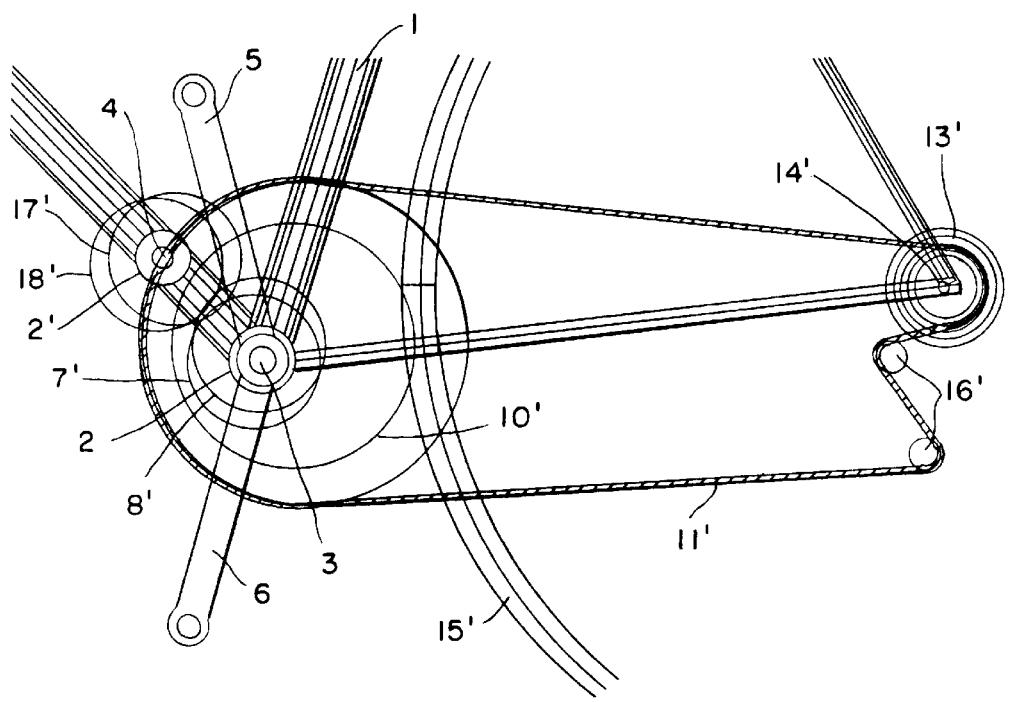
FIG. 5 shows another schematic view, in this case a side elevation, of the mechanism of the previous figure applied to a bicycle frame.
Figure 6:
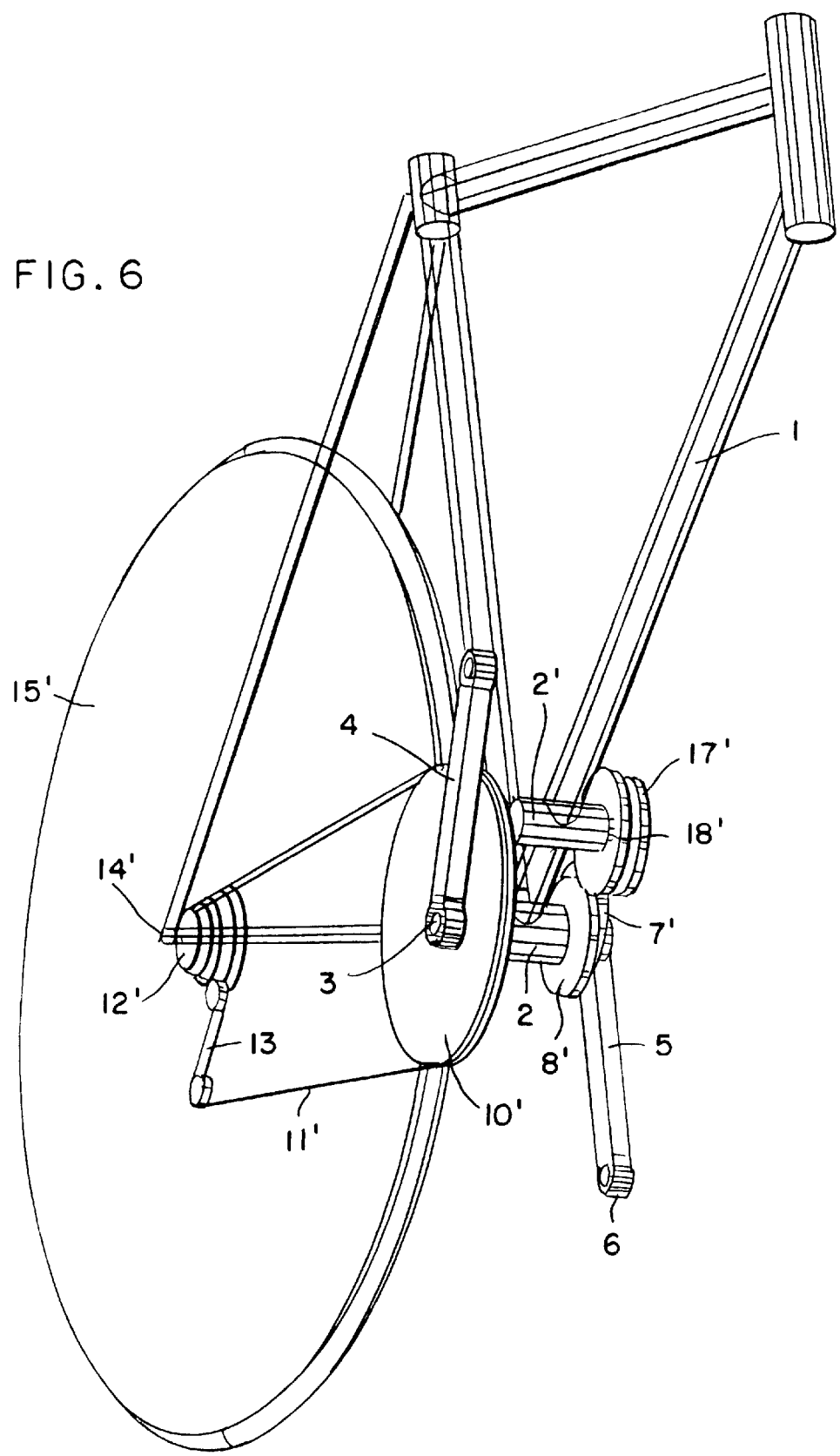
FIG. 6 shows a general perspective view of the mechanism displayed in the two previous figures.

FIGS. 4, 5 and 6 show improvements of the previously described mechanism in a way that common and basic elements such as housings (2) and (2'), frame (1), main and active pedal axles (3), secondary axle (4) and pedal rods (5) and (6) are identified with the same numbers in both cases.

According to the improvements, and bearing in mind that the right pedal rod (5) rotated integrally with the main axle or active pedal axle (3) and that the left pedal rod (6) rotates freely in respect to said axle (3), on the side of pedal rod (5) are mounted the elliptic gears (7') and (8') which engage elliptic gears (17') and (18'), the former being mounted on the active pedal axle (3) and the latter being mounted on secondary axle (4). Therefore, the power is transmitted to the chain wheels (10') mounted on the opposite side of said active pedal axle (3) and through the chain (11') to the sprocket wheels (13') associated to tension pulley or gear shift (16'), said sprocket wheels (13') being mounted on the axle (14') of rear wheel (15').

Thus, one of the improvements in regard to the mechanism shown in FIGS. 1 and 3 consists in eliminating one of the chains and associated chain wheel, sprocket wheel and gear shift, enabling the two pairs of elliptic gears (7'-8') and (17'-18') to be placed on the same side of the frame (1), precisely on the side from where the above mentioned elements were removed.

Bearing in mind parameter δ (chain wheel off-centering/ original radius of the ring gear) and eccentricity ϵ of the gears according to the improvement and if δ=2ϵ is used, one single chain will suffice, drive from one of the pedal rods (5) being provided directly through chain (11'), while the opposite pedal rod is affected by a gear drive.

Operation of the mechanism according to the improvements described and shown in FIGS. 4, 5 and 6, is as follows:

Right pedal rod (6) is integral to chain wheel assembly (10'), which provides power output through chain (11'), and to elliptic gear (8'). This assembly is mechanically coupled, by means of secondary axle (4) integral to elliptic gears (18') and (17'), to the assembly formed by left pedal rod (6) and elliptic gear (7').

The two (non-integral) assemblies corresponding to the pedal rods rotate independently (although synchronized through the secondary axle assembly) around one same axle (3) lodged in the active pedal axle housing (2), both gears (7') and (8') being centered in one of their centers in respect to this axle.

Likewise, gears (17') and (18') are centered in one of their centers in respect to secondary axle (4) lodged in the second housing (2'), and are furthermore offset in 180°.

In view that when one of the pedals is in front and the other behind the pedal rods must be in a 180° position, the relative angle position between each pedal rod and its corresponding elliptic gear must be such that when each pedal rod is in its most forwardly position (horizontal position) the corresponding gear should be transmitting drive with a maximum radius (from the point farthest from the axle).

The four elliptic gears (7', 8', 17' and 18') must have the same eccentricity and size; if required, the gears may be circular and off-centered instead of elliptic.

With this improvement, a bicycle is obtained which is driven by synchronized independent pedals with sinusoidally varying transmission ratio that is more compact, more lightweight and less complex, as a result of fewer parts being involved, than its predecessors, and is consequently less expensive to manufacture. Furthermore, in view that it has fewer movable parts, undesirable and unnecessary friction is prevented.

The advantages of this mechanism in respect to the one using two chains are the following:

Less difference in respect to the shape of a standard bicycle.

Greater simplicity of the mechanism, since the use of one chain wheel, one chain, sprocket wheels and a gear shift is avoided, all these components being removed without replacing them with any other part; furthermore, a special bushing incorporating respective sprocket wheels on both sides is replaced by a standard bushing.

It allows for pairs of gears to be installed on the same side of the bicycle frame (1), thereby providing a larger space for the gear shift, as in a standard bicycle. Thus, as can be appreciated from FIGS. 4 and 5, it allows for gear shifts in both the sprocket wheels and in the chain wheels.

A second improvement, applicable to the mechanism fitted with the first improvement, as previously described, consists in replacing the eccentric circular chain wheel by an eccentric ovoid (non circular) chain wheel, the geometric characteristics of which optimize the power output.

Consequently, this is an eccentric chain wheel having an ovoid shape, whereby in order to have a constant speed in the chain (and therefore also in the bicycle) the efficiency distribution is sinusoidal in time, or, in other words, the pedal rod speed distribution varies sinusoidally according to the rotation angle of the pedal rod, this coinciding with the speed variation of the pedal rods based on their position when the speed of the secondary axle is constant. Therefore, the power output is equal to that of a circular wheel chain, with the same efficiency applied to the secondary axle, although in the opposite rotational direction, i.e. in the direction in which the bicycle advances.

In this manner, identical kinematics is achieved for each pedal, thus optimizing the movement of the legs, since a single round chain wheel involves a slight variation between the speeds of both legs, a variation which in fact is imperceptible in actual practice.

The shape of the chain wheel is the result of taking the envelope of the straight lines adopted at each moment by the chain which provides drive from the chain wheel to the sprocket when the chain wheel transmission ratio variation is sinusoidal in time, in order to provide a constant bicycle speed.

The sinusoidal function providing this transmission ratio is as follows:

$$r(t) = \frac{1 + 2 \cdot \epsilon \cos(W \cdot t) + \epsilon^2}{1 - \epsilon^2} \cdot R$$

where R is the radius of the equivalent circular chain wheel:

$$R = \frac{1}{4 \cdot \sin(\pi/N)} \text{ inches}$$

where N is the number of teeth and w.R is the chain speed.

The angular speed $\Omega$ of the pedal rods derives from the following:

$$\Omega(\theta) = \frac{1 + 2 \cdot \epsilon \cdot \cos(\theta) + \epsilon^2}{1 - \epsilon^2} \cdot \omega$$

and thus the sinusoidal function provided by the transmission ratio on the basis of the angle is as follows:

$$r(\theta) = \frac{1 - \epsilon^2}{1 + 2 \cdot \epsilon \cdot \cos(\theta) + \epsilon^2} \cdot R$$

In this manner, it is intended to take the envelope of the straight lines (tangent to the chain wheel) which rotate with it in respect to its axle, the distance to this axle (equivalent transmission ratio $r(\theta)$) varying with the angle of the pedal rod (at the time of being drawn) as the reverse of a sinusoid; said straight lines being drawn at each moment from a fixed point at a distance D from the chain wheel rotation angle.

It has already been stated that $\epsilon$ is the eccentricity of the gears.

Figure 7:
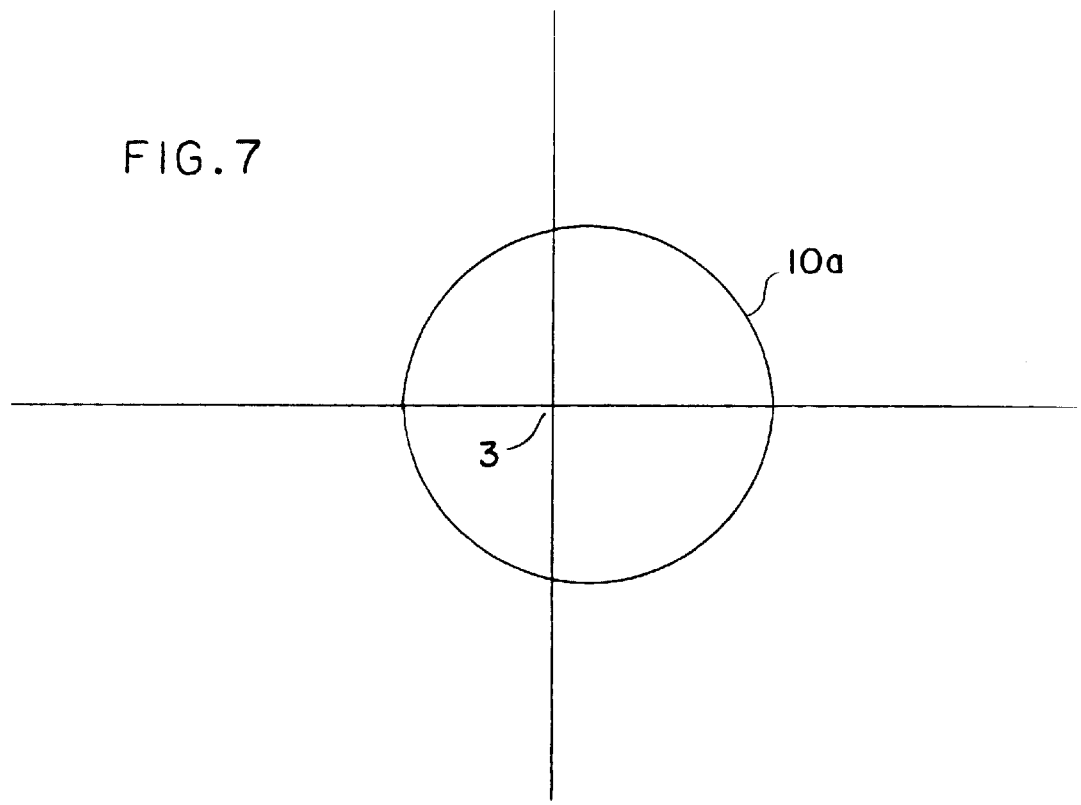
FIGS. 7 to 14 show contours which correspond to respective chain wheels with four different efficiencies and two different eccentricities.
Figure 8:
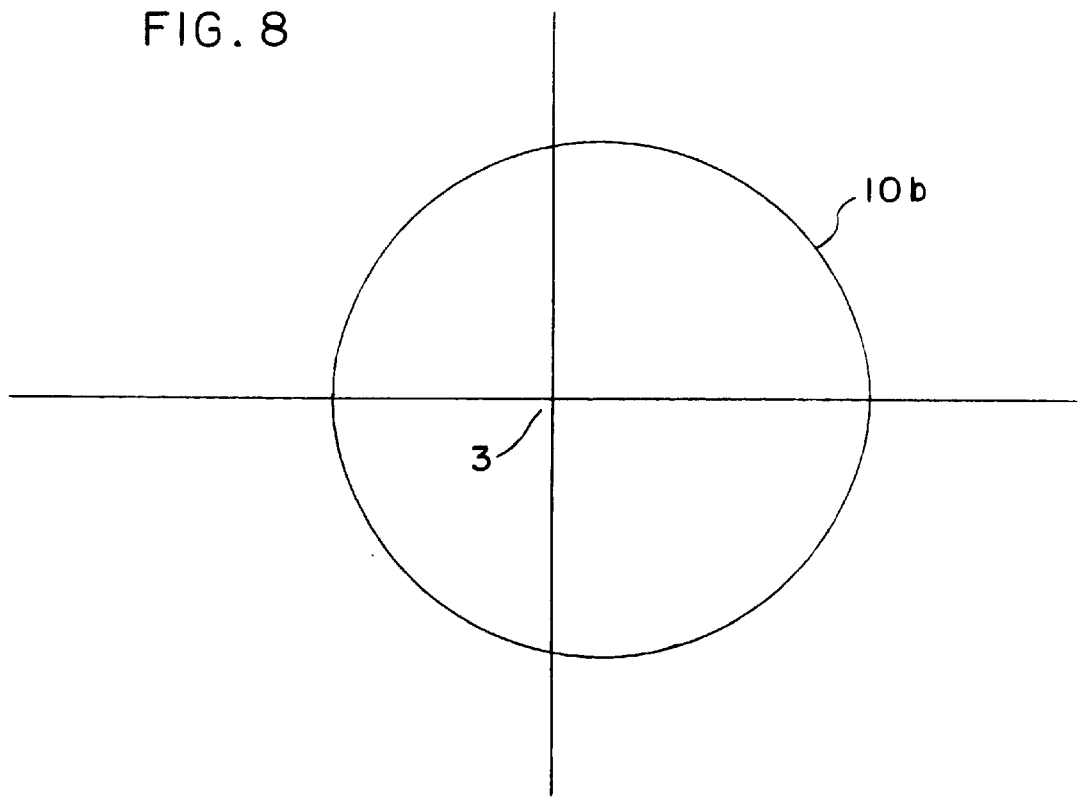
Figure 9:
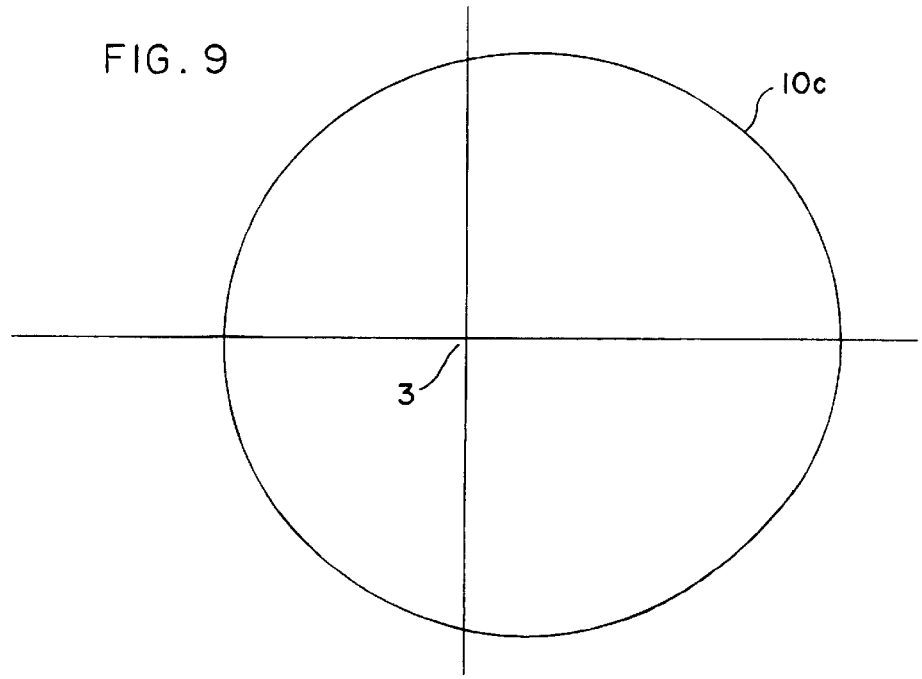
Figure 10:
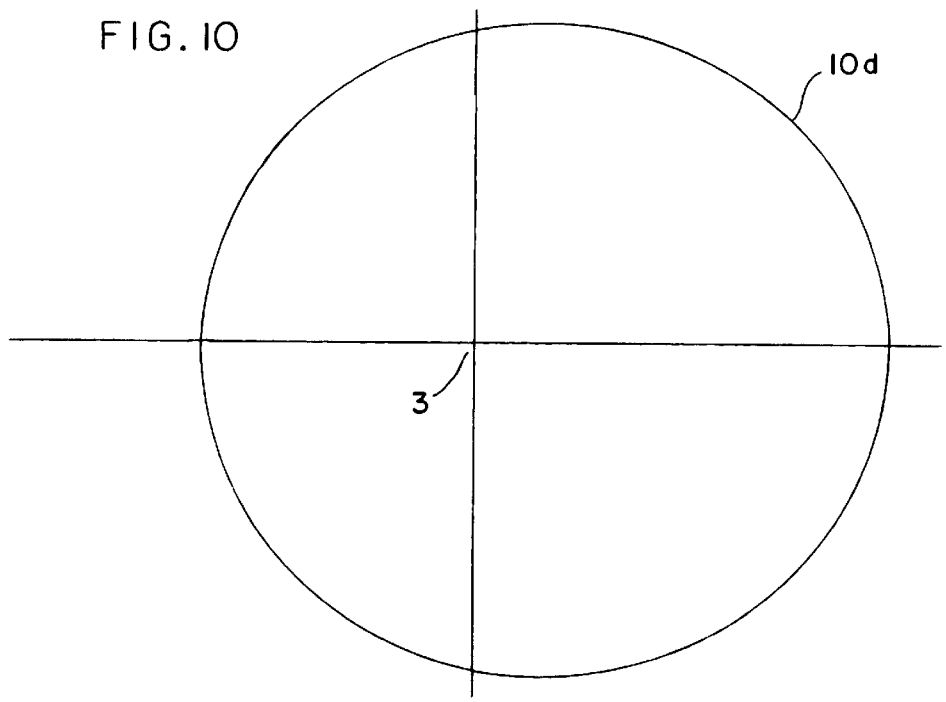
Figure 11:
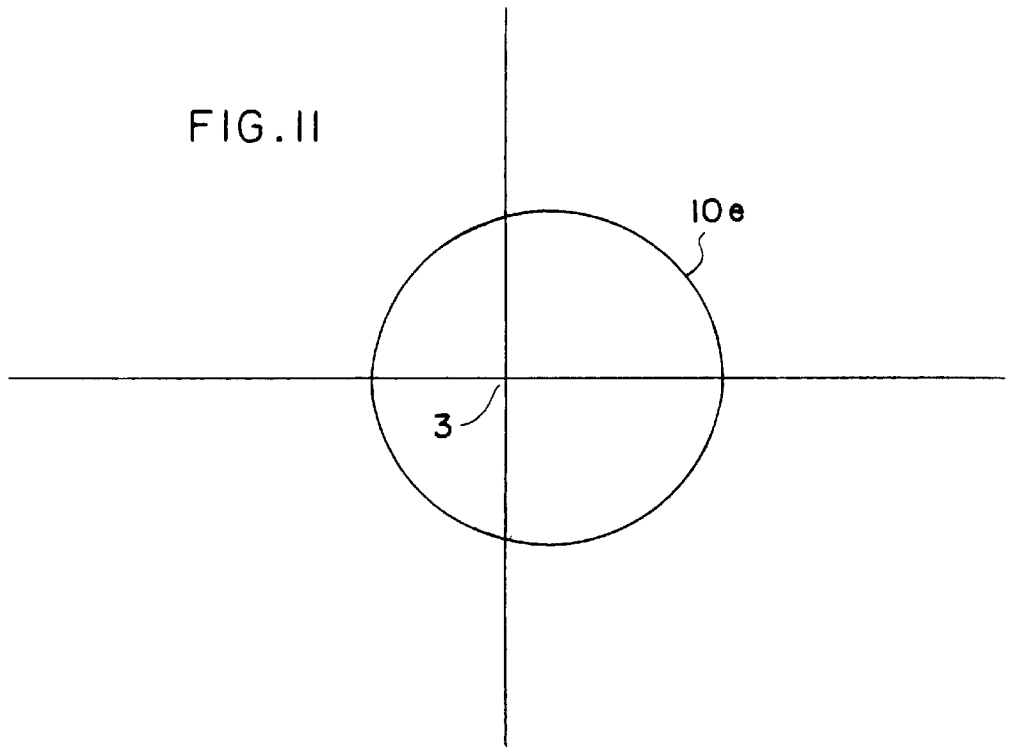
Figure 12:
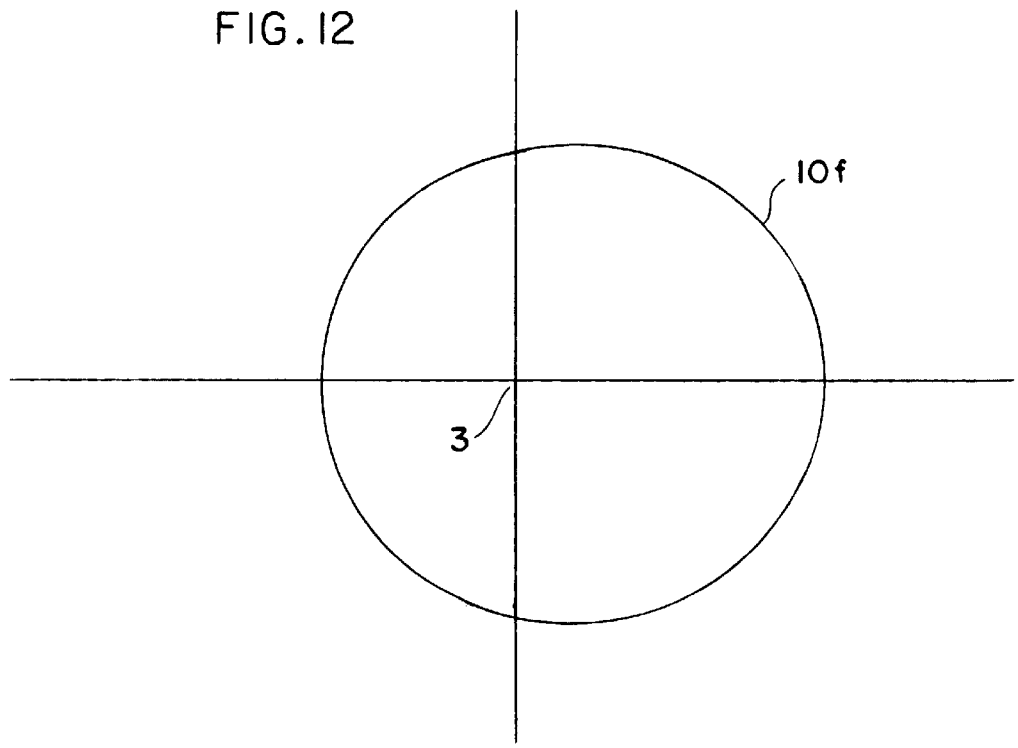
Figure 13:
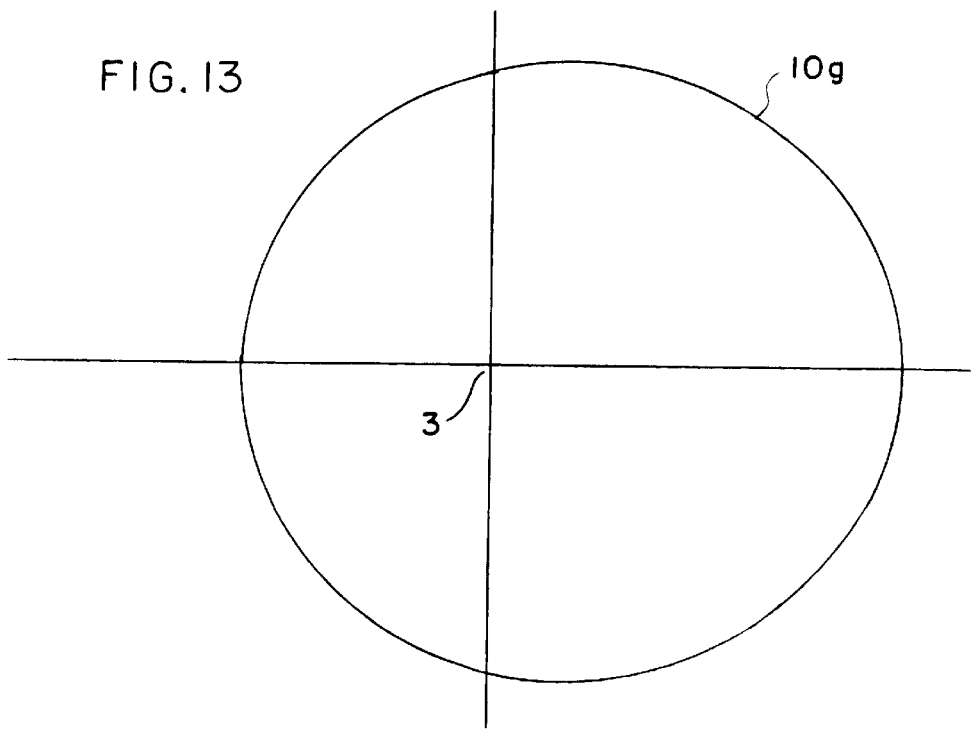
Figure 14:
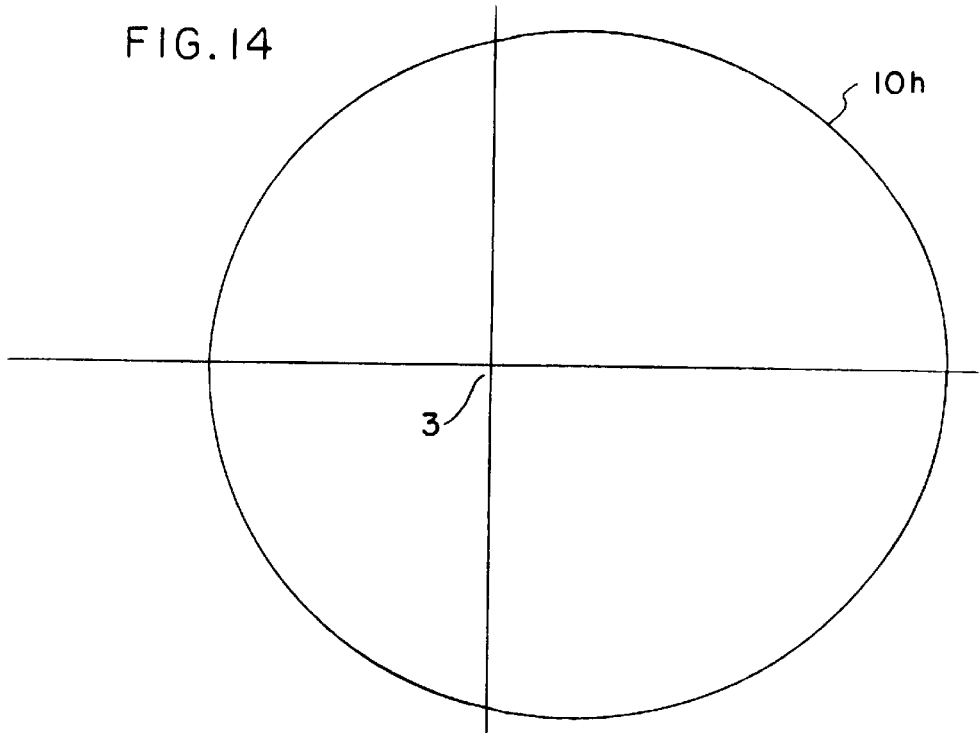

In view that for each chain wheel D is considered to be a fixed value and given that the relative shape for small variations in size varies infinitely, several chain wheels corresponding to four efficiencies and two eccentricities are shown hereunder:

FIG. 7: ($\epsilon$,N)=(0.11, 27) Chain wheel 10a
FIG. 8: ($\epsilon$,N)=(0.11, 39) Chain wheel 10b
FIG. 9: ($\epsilon$,N)=(0.11, 53) Chain wheel 10c
FIG. 10: ($\epsilon$,N)=(0.11, 59) Chain wheel 10d
FIG. 11: ($\epsilon$,N)=(0.125, 27) Chain wheel 10e
FIG. 12: ($\epsilon$,N)=(0.125, 3) Chain wheel 10f
FIG. 13: ($\epsilon$,N)=(0.125, 53) Chain wheel 10g
FIG. 14: ($\epsilon$,N)=(0.125, 59) Chain wheel 10h All the figures correspond to chain wheels having a right drive rotation direction, the intersection of the axles being the point corresponding to the rotation axle (3), that is to say, that of the active pedal axle.

The eight chain wheels are shown in the same 0.424:1 scale.

The angle position of the pedal rod is such that, the moment the chain attacks the chain wheel at its maximum radius, the pedal rod is approximately 90° from the upper dead center.

Therefore, according to the second improvement of the invention, the use of chain wheels in a bicycle optimizes the power output and tends to provide greater pedalling comfort.

If off-center ovoid plates are used in the bicycle fitted with two chains, synchronization between the elliptic gear system (defining the angle between the pedals) and the positions of each pedal imposed by the geometry of their respective chain wheels is optimized during the cycle and the angle positions imposed by both systems coincide, resulting in improved synchronization of the chain, sprocket wheel and chain wheel system and unloading from the gear assembly part of that responsibility, thus eliminating the need to provide great precision to the gear synchronization mechanism.

The object of this application is therefore to cover both the sporting mode, which comprises the field of cycling, and any other application which requires the use of a pedal drive, since, as described, it provides a spectacular increase in performance compared to currently used pedal drive systems.

I claim:

1. An improved synchronized independent pedals human traction mechanism with sinusoidally varying transmission ratio applicable to bicycles in order to achieve a better distribution of power delivered by a cyclist's legs, based on independence of bicycle pedal rods in such a manner that avoids both legs of a cyclist coinciding in dead centers, characterized in that the bicycle pedal rods are independent and synchronized by means of two pairs of elliptic gears, and said pedal rods convey drive to a bicycle rear wheel through two corresponding off-centered chain wheels and two corresponding parallel chains.

2. An improved synchronized independent pedals human traction mechanism with sinusoidally varying transmission ratio, according to claim 1, characterized in that said two parallel chains convey drive towards a bicycle rear wheel axle, which fits two corresponding sprocket wheel assemblies, each one being capable of rotating freely in opposite direction with respect to rotation of the bicycle rear wheel when riding the bicycle, and two tension pulley shifters, one for each chain, which are required in order to allow speed shifting and in order to compensate for off-centered rotation of each chain wheel.

3. An improved synchronized independent pedals human traction mechanism with sinusoidally varying transmission ratio, according to claim 1, characterized in that the bicycle has a bicycle frame fitted with a pair of housings: one is a housing for the pedals axis and the other is a housing for the secondary axis.

4. An improved synchronized independent pedals human traction mechanism with sinusoidally varying transmission ratio applicable to bicycles in order to achieve a better distribution of power delivered by a cyclist's legs, based on independence of pedal rods in such a manner that avoids both legs coinciding in dead centers, characterized in that the bicycle pedal rods are independent and synchronized by means of two pairs of elliptic gears, one of said pedal rods being integral with an off-centered chain wheel set which conveys drive to a bicycle rear wheel through a corresponding chain, another of said pedal rods transmitting power by means of the gears, first to the pedal rod which is integral with the off-centered chain wheel set, and from there to the bicycle rear wheel; said elliptic gear pairs being mounted on two respective axes, each gear being respectively situated with one focus of a corresponding ellipse on one of these two axes; one of said axes is a pedals axis and the other is a secondary axis parallel to the pedals axis and situated at such a distance from the pedals axis that gears on both axes engage; each of said pedal rods is integral with one of the two elliptic gears mounted on the pedals axis, forming two independent assemblies: a pedal rod-gear assembly and a pedal rod-gear-chain wheel set assembly; the other two remaining elliptic gears are integral with each other in a way that they are rotated 180° to each other, and are mounted on said secondary axis, forming the secondary axis assembly; the mission of the secondary axis assembly is synchronizing the two pedal rods and conveying drive from the pedal rod-gear assembly to the pedal rod-gear-chain wheel set assembly; drive from the chain wheel set is conveyed by the chain towards an axle of the bicycle rear wheel, which fits a corresponding sprocket wheel assembly, and a tension pulley shifter which is required in order to allow speed shifting and in order to compensate for off-centered rotation of the driving chain wheel.

5. An improved synchronized independent pedals human traction mechanism with sinusoidally varying transmission ratio, according to claim 4, characterized in that the bicycle has a bicycle frame fitted with a pair of housings: one is a housing for the pedals axis and the other is a housing for the secondary axis.

* * * * *